United States Patent [19]
Takashima

[11] Patent Number: 5,476,012
[45] Date of Patent: Dec. 19, 1995

[54] AIR FLOW SENSOR WITH SWIRL GENERATOR

[75] Inventor: Akira Takashima, Himeji, Japan

[73] Assignee: Mitsubishi Denki Kabushiki Kaisha, Tokyo, Japan

[21] Appl. No.: 216,720

[22] Filed: Mar. 23, 1994

[30] Foreign Application Priority Data

Mar. 25, 1993 [JP] Japan .................................. 5-066765

[51] Int. Cl.⁶ .................................................... G01F 1/34
[52] U.S. Cl. ........................................ 73/861.34; 73/202.5
[58] Field of Search ........................... 73/118.2, 204.11, 73/204.17, 204.22, 202.5, 861.22, 861.63, 861.65, 861.79, 198, 861.42, 204.21, 861.34

[56] References Cited

U.S. PATENT DOCUMENTS

| | | | |
|---|---|---|---|
| 3,719,080 | 3/1973 | Burgess | 73/861.34 |
| 3,890,838 | 6/1975 | Paetzold | 73/861.34 |
| 4,418,568 | 12/1983 | Surman | 73/202.5 |
| 4,920,808 | 5/1990 | Sommer | 73/202.5 |
| 5,209,113 | 5/1993 | Sawada et al. | 73/202.5 |
| 5,415,049 | 5/1995 | Takami et al. | 73/861.42 |

FOREIGN PATENT DOCUMENTS

| | | | |
|---|---|---|---|
| 3810889 | 10/1989 | Germany | 73/861.34 |
| 103061 | 6/1982 | Japan . | |
| 61411 | 4/1983 | Japan . | |
| 111720 | 7/1983 | Japan . | |
| 187219 | 8/1987 | Japan . | |
| 243721 | 10/1988 | Japan . | |

Primary Examiner—Richard Chilcot
Assistant Examiner—Elizabeth L. Dougherty
Attorney, Agent, or Firm—Sughrue, Mion, Zinn, Macpeak & Seas

[57] ABSTRACT

An air flow sensor includes a duct forming a part of an intake passage, and a detection device. A swirl generating structure is also arranged in the duct to generate a swirl in the duct. A projection extending upstream from the opening at the upstream end of the duct is further disposed on the swirl generating means. Thus, the air flow rate can be accurately detected without requiring a structural member for the intake system.

8 Claims, 8 Drawing Sheets

AIR FLOW SENSOR WITH SWIRL GENERATOR

BACKGROUND OF THE INVENTION

1. Field of the Invention

The present invention relates to an air flow meter for detecting an engine intake air flow rate, used for electronically controlling the engine (hereinafter referred to as "air flow sensor"). More particularly, the invention relates to an air flow sensor which is arranged downstream of an air cleaner and in which the characteristics peculiar to such an air flow sensor are not influenced even when the flow velocity distribution is not uniform over the cross-sectional area of the passage.

2. Description of the Related Art

Conventional air flow sensors are known as disclosed in, for example, Japanese Patent Laid-Open Nos. 63-243721, 58-111720, 62-187219, 58-61411 and 57-103061.

FIG. 12 is a sectional view of the device for detecting the engine intake air flow rate and shows the construction of the in take system disclosed in Japanese Patent Laid-Open No. 63-243721. Referring to FIG. 12, a swirl forming duct 12 is arranged upstream of a hot wire-type air flow sensor 11, and an air cleaner 13 removes dust particles from the intake air before it flows through the swirl forming duct 12.

FIG. 13 is a sectional view of the construction of the intake system disclosed in Japanese Patent Laid-Open No. 58-111720. Referring to FIG. 13, a guide pipe 22 is disposed in an air cleaner 23 arranged upstream of an air flow sensor 21, thereby relaxing turbulence in the intake air caused by a wake produced due to the shape of the portion adjacent to a bladder of the air cleaner 23.

FIG. 14 is a sectional view of the construction of the intake system disclosed in Japanese Patent Laid-Open No. 62-187219. Referring to FIG. 14, a honeycomb flow setting member 32 is fixed to the upstream end of an air flow sensor 31, thereby inhibiting disturbance in an output signal transmitted from the air flow sensor 31.

FIG. 15 is a sectional view of the construction of the intake system disclosed in Japanese Patent Laid-Open No. 58-61411. Referring to FIG. 15, an air cleaner 43 is disposed upstream of a flow setting tube 42 to which an air flow sensor 41 is attached. A flow setting grid 44 is further positioned in the air cleaner 43 and is attached to the upstream end of the flow setting tube 42. It thus sets the air flow from the air cleaner 43, and the flow setting tube 42 also decreases turbulence in the air flow.

FIG. 16 is a sectional view of the construction of the intake system disclosed in Japanese Patent Laid-Open No. 57-103061. Referring to FIG. 16, a bent tube 52 intervenes between an air flow sensor 51 and an air cleaner 53, and a flow setting grid 54 is also attached to the downstream end of the bent tube 52. The bent tube 52 thus alters the direction of the flow from the air cleaner 53, and the flow setting grid 54 calms air turbulence produced in the bent tube 52.

That is, all the conventional air flow sensors described above are arranged downstream of the air cleaners. In order to inhibit air turbulence, the flow setting means sets air flowing from the air cleaner, or the duct through which air flows is specifically constructed.

However, such conventional air flow sensors present the following problems. They cannot inhibit or relax the turbulence in the intake air flow caused by the shape of the air cleaner without providing a structural member for the intake system. The output values detected by the air flow sensor are thus not always reliable and a correct detection of the air flow cannot be performed if the air flow sensor is soiled.

Further, since it is necessary to provide conventional air flow sensors with flow setting means for the intake system and with structural members, such as, a duct through which the set-air flows, the design of the intake system has to be limited by such structural members. More specifically, a space is required to fix structural members, such as a flow setting tube and a guide pipe, within the air cleaner, and consequently, the shape of the air cleaner is restricted, or the structural member such as a duct must be disposed between the air cleaner outlet and the air flow sensor.

SUMMARY OF THE INVENTION

Accordingly, in order to overcome the above drawbacks, an object of the present invention is to provide an air flow sensor which is capable of detecting the air flow rate correctly without requiring structural members for the intake system.

In order to achieve the above objects, according to the present invention, there is provided an air flow sensor fixed to be placed in an intake passage through which air is supplied to an engine, the sensor including: a duct forming a part of the intake passage; and a detection device for generating electrical power according to the air flow rate within the intake passage; the sensor further comprising: swirl generating means arranged in the duct, for generating a swirl into the duct; and a projection arranged on the swirl generating means so as to project upstream from an opening at the upstream end of the duct.

DESCRIPTION OF THE PREFERRED EMBODIMENTS

The present invention will be described on the basis of embodiments shown in FIGS. 1–11.

Embodiment 1

Figure 1:
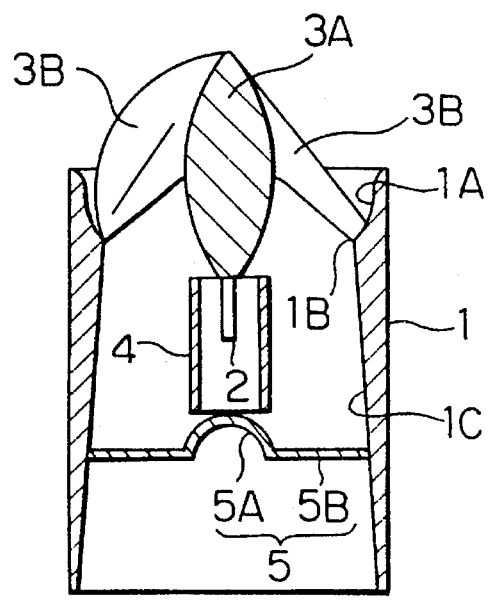
FIG. 1 is a sectional view of one embodiment of an air flow sensor according to the present invention.
Figure 3:
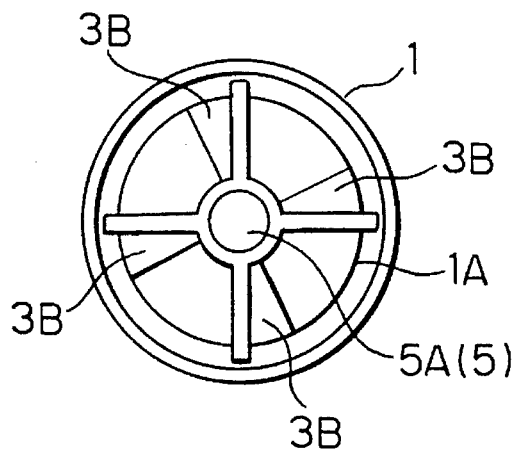
FIG. 3 is a front view from downstream of the air flow sensor shown in FIG. 1.
Figure 2:
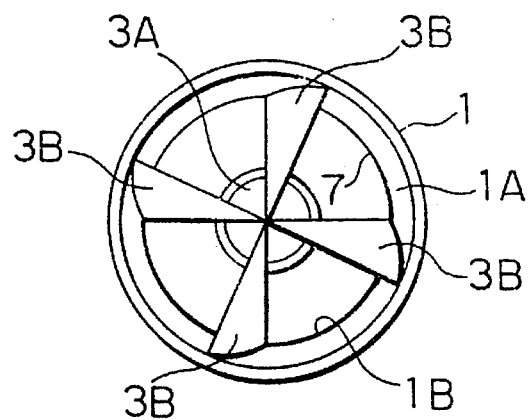
FIG. 2 is a front view from upstream of the air flow sensor shown in FIG. 1.

As shown in FIGS. 1–3, an air flow meter (hereinafter referred to as "air flow sensor") of this embodiment comprises: a duct 1 forming part of an intake passage through which air is supplied to an engine, a thermal flow rate detection device 2 for generating an electrical output signal according to the air flow rate within the intake passage, and swirl generating means 3 arranged in the duct 1 for generating a swirl into the duct 10 The air flow sensor is thus fixed into the intake passage.

Figure 7:
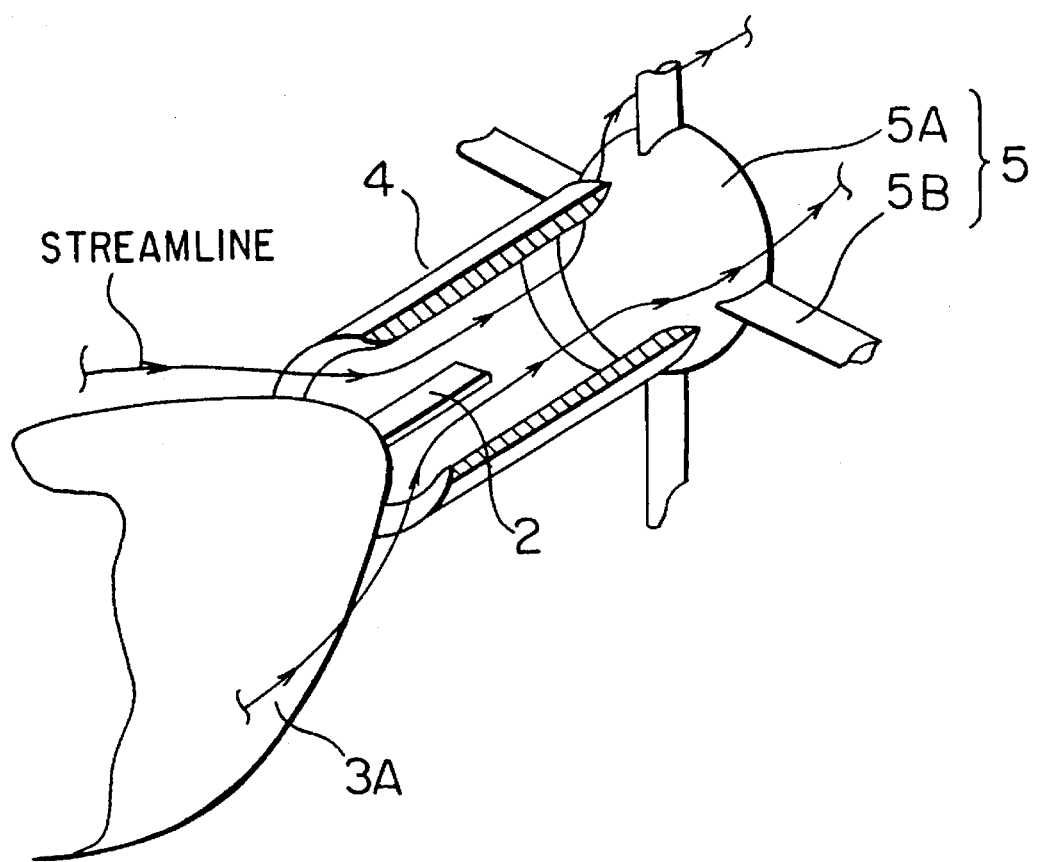
FIG. 7 is a perspective view of an essential portion explanatory of the air flow when the flow rate is detected by a detection device of the air flow sensor shown in FIG. 1.

The swirl generating means 3 comprises, a spindle-like flow setting cone 3A placed axially at the center of the opening on the upstream end of the duct 1, and four guide vanes 3B which support the flow setting cone 3A from its upstream end to the middle of its downstream end on its outer surface by the top ends of the guide vanes 3B and which are fixed at their base ends to the inner surface of the opening on the upstream end of the duct 1. Fixed to the downstream end of the flow setting cone 3A are the thermal flow rate detection device 2 and a flow detection duct 4 to form a flow detection passage by surrounding the thermal flow rate detection device 2 with spaces therebetween. A backflow preventing member 5 is arranged on the downstream end of the flow detection duct 4 to prevent abnormal flow and backflow from the downstream end. As shown in FIGS. 1 and 7, the backflow preventing member 5 comprises a semi-spherical backflow preventing portion 5A and support bars 5B for supporting the backflow preventing portion 5A from the four directions, in which one end of end support bar 5B is fixed to the inner surface of the duct 1.

As shown in FIG. 1, the flow setting cone 3A and the guide vanes 3B forming the swirl generating means 3 project at their centers from the opening on the upstream end of the duct 1 toward the upstream end thereof so as to form a projection portion. Sweepback angles are provided for the flow setting cone 3A and the guide vanes 3B in the airflowing direction. An angle of attack is further provided for the surface including the center axis of the duct 1 and another angle of attack is also provided for the surface including the radius of the duct 1. Thus, as illustrated in FIGS. 1 and 2, the guide vanes 3B are curved such that each of the top ends adjacent to the upstream end is tilted downward from the upstream end of the flow setting cone 3A to the upstream end of the duct 1, and each of the bottom ends adjacent to the downstream end is tilted downward and slightly displaced counterclockwise from each of the top ends adjacent to the upstream end. The guide vanes 3B are thus formed to swirl for the air flowing into the duct 1, in cooperation with the flow setting cone 3A. An opening end 1A of the duct 1 for supporting the guide vanes 3B is enlarged in an arch-like shape from downstream to the upstream end along with the curved shape of the flow setting cone 3A and that of the guide vanes 3B. A Venturi portion 1B is also arranged where the inner diameter of the duct 1 is minimized further upstream of the flow rate detection device 2, that is, in the portion where the end from which the opening end 1A starts to enlarge. The opening end 1A and the Venturi portion 1B are thus constructed to draw the air swirl generated by the swirl generating means 3 to the axial center of the duct 1. A diffuser portion 1C is also formed in the duct 1 downstream from the Venturi portion 1B.

Figure 4:
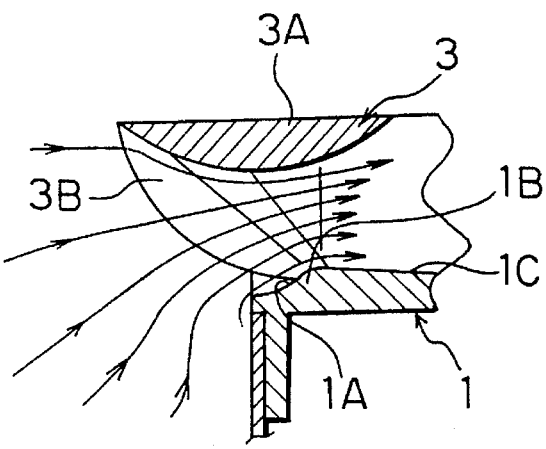
FIG. 4 is a sectional view of an essential portion explanatory of the air flow into the air flow sensor shown in FIG. 1.
Figure 5:
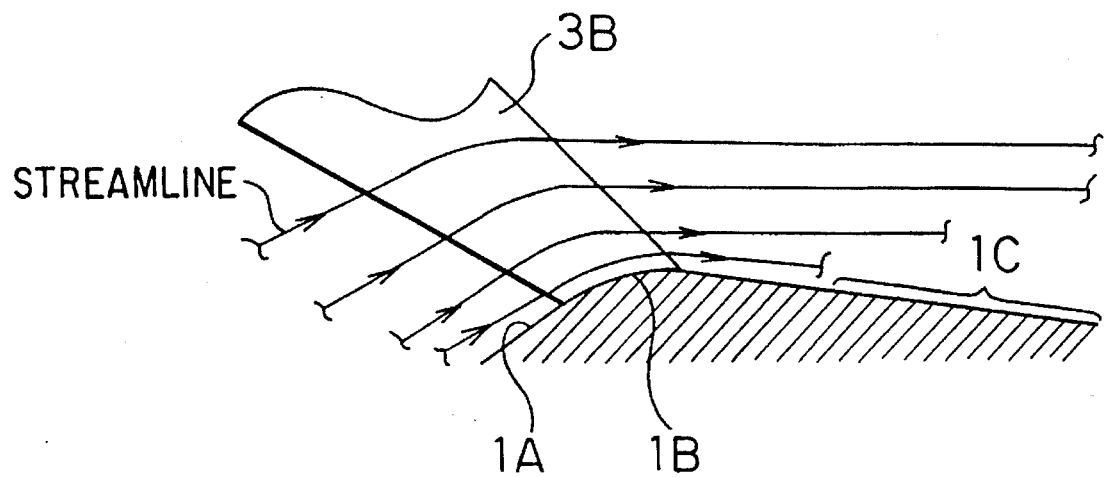
FIG. 5 is a sectional view of an essential portion explanatory of the air flow into the air flow sensor shown in FIG. 1.
Figure 6:
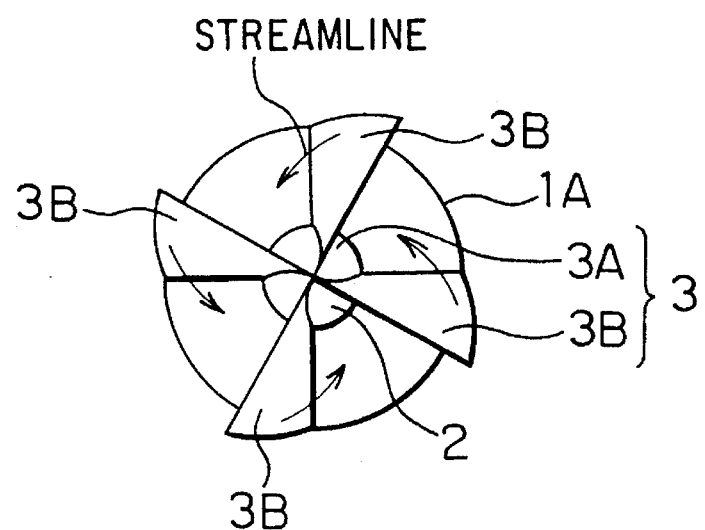
FIG. 6 is a front view of an essential portion upstream explanatory of the air flow into the air flow sensor shown in FIG. 1.

The operation of the air flow sensor will now be explained. In order to supply the air to the engine, the air first flows into the intake passage and is then fed into the duct 1 while being circulated by the swirl generating means 3 of the air flow sensor. More specifically, the air first flows from the upstream end of the flow setting cone 3A and that of the guide vanes 3B forming the projection portion of the swirl generating means 3, and from the opening formed at the opening end of the duct 1. The area of the opening is larger than that of the flow passage crossing at right angles with the axis of the duct 1, and the structure of the opening is enlarged so as to allow the air to be drawn from the surrounding portions into the opening. At this time, as shown in FIGS. 4 and 5, the air flow velocity is gradually accelerated by means of the Venturi portion 1B so as to favorably reduce the turbulence in the air flow upstream but to unfavorably increase the pressure loss in proportion to the square of the flow velocity. However, the air flow passing through the Venturi portion 1B is decelerated in the diffuser portion 1C shown in FIG. 5 so as to recover the pressure loss produced in the Venturi portion 1B. The air flowing in the diffuser portion 1C is inhibited from being separated on the wall of the diffuser portion 1C through the sweepback angle of the guide vanes 3B, thereby preventing turbulence in the air flow. As shown in FIG. 6, the air flow also produces vectors flowing toward the center of the swirl generating means 3 through the angle of attack of the guide vanes 3B so as to flow into the duct 1 while circulating counterclockwise, as indicated by the arrows in FIG. 6.

The air flowing toward the center of the duct 1 flows along the surface of the flow setting cone 3A, and as shown in FIG. 7, it further flows into the flow detection duct 4 in which the flow rate is detected by the thermal-type flow detection device 2 attached to the downstream end of the flow setting cone 3A. Then, it is introduced into the backflow preventing portion A of the backflow preventing member 5 downstream, further flows downstream from the detection duct 4, and then joins together with other flows. During this flow, the backflow preventing member 5 prevents abnormal flow or backflow downstream of the backflow preventing member 5. As a result, the air flow rate can be correctly detected in the flow detection duct 4 by the thermal-type flow rate detection device 2.

As will be clearly understood from the foregoing description, the above embodiment offers the following advantages.

The air flow sensor can be built into the intake passage as a part thereof, and also the swirl generating means 3 is arranged to determine the air flow at the outlet of the air cleaner and to stabilize the flow. Consequently, it is unlikely that the air flow around the thermal-type flow detection device 2 will be easily influenced by other components and conditions, thereby stabilizing the flow and enabling a correct and reliable detection of the flow rate, as well as also making the apparatus small.

Embodiment 2

Figure 8:
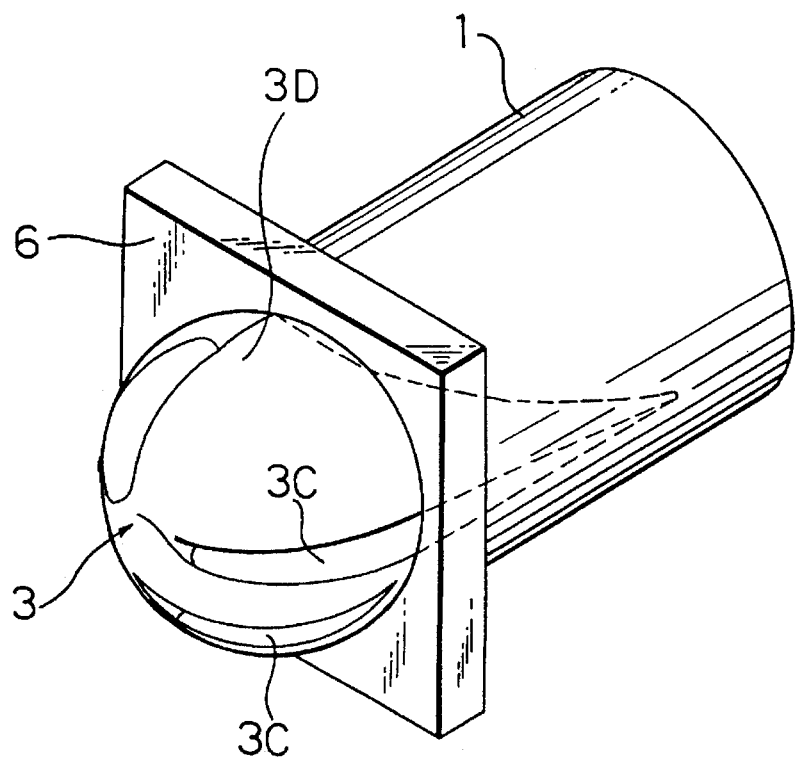
FIG. 8 is a perspective view of an essential portion of another air flow sensor according to the present invention.
Figure 9:
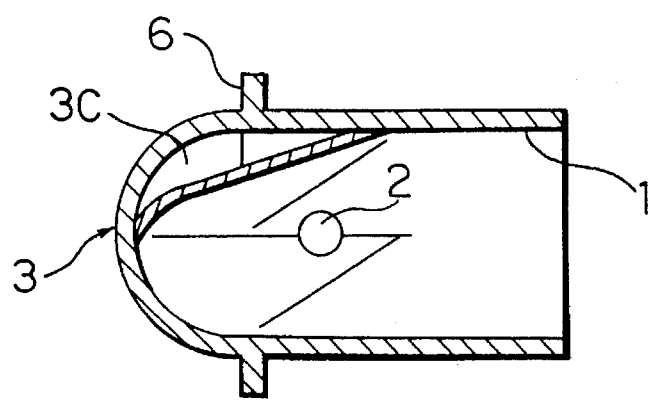
FIG. 9 is a sectional view of the air flow sensor illustrated in FIG. 8.

The air flow sensor of Embodiment 2 will be described. Components corresponding to Embodiment 2 have been given the same reference numerals as in Embodiment 1. As shown in FIGS. 8 and 9, the air flow sensor of Embodiment 2 comprises: a duct 1 forming part of an intake passage through which air is supplied to an engine; a thermal-type flow rate detection device 2 for generating electrical power according to the air flow rate within the intake passage; and swirl generating means 3 arranged in the duct 1 for generating a swirl into the duct 1. The air flow sensor is fixed to an air cleaner (not shown) via a joint portion 6 therebetween. The joint portion 6 is formed to suit the shape of the air cleaner and, in this embodiment, it is formed in a narrow shape.

Figure 10:
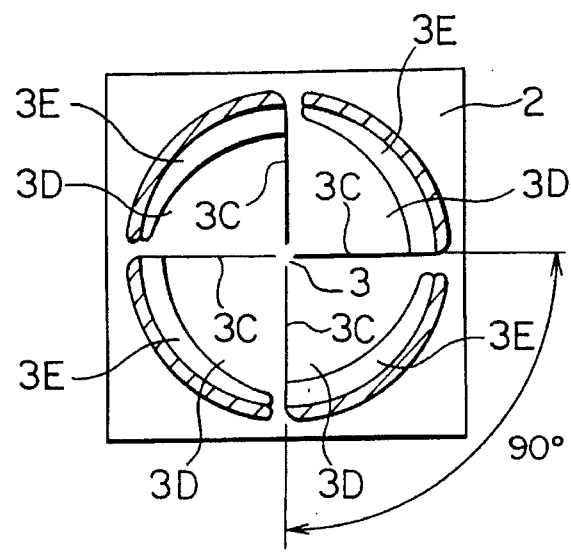
FIG. 10 is a front view from upstream of the air flow sensor shown in FIG. 8.
Figure 11:
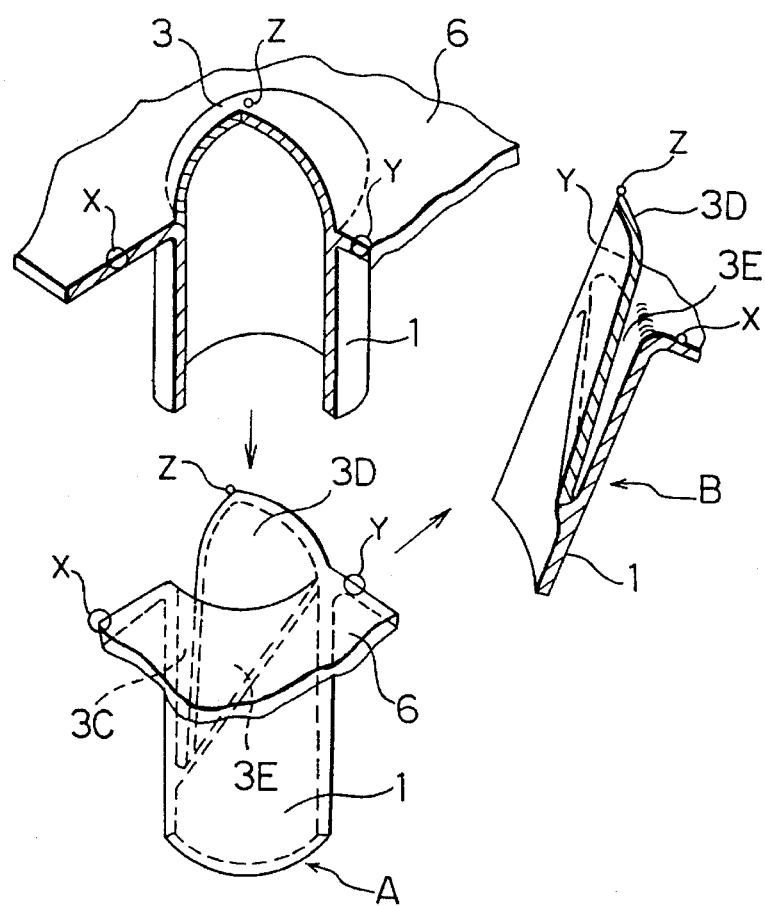
FIG. 11 is an exploded perspective view of essential portions of the air flow sensor illustrated in FIG. 8.
Figure 12:
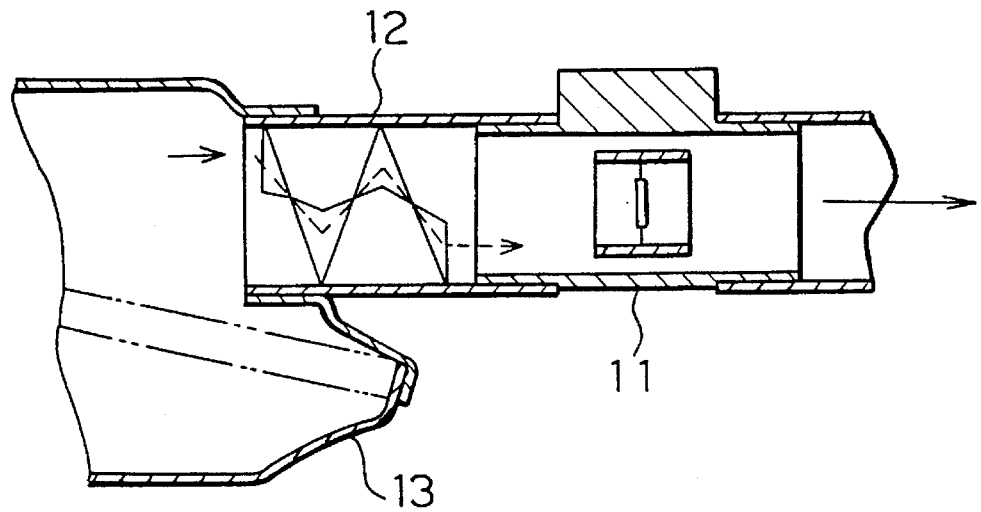
FIG. 12 is a sectional view of one example of the construction of an intake system using a conventional air flow sensor.
Figure 13:
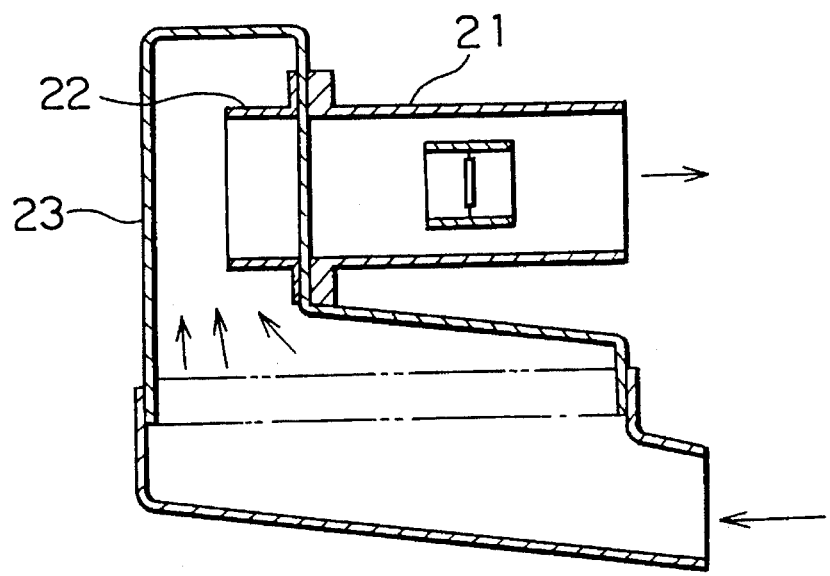
FIG. 13 is a sectional view of another example of the construction of an intake system using a conventional air flow sensor.
Figure 14:
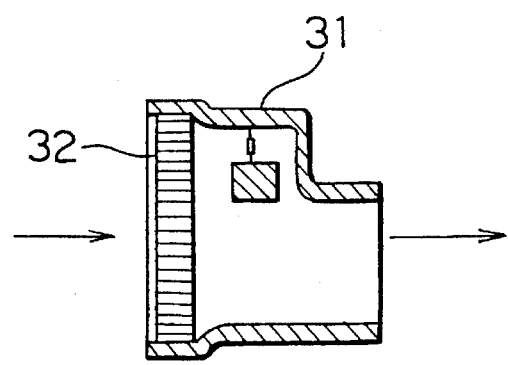
FIG. 14 is a sectional view of a further example of the construction of an intake system using a conventional air flow sensor.
Figure 15:
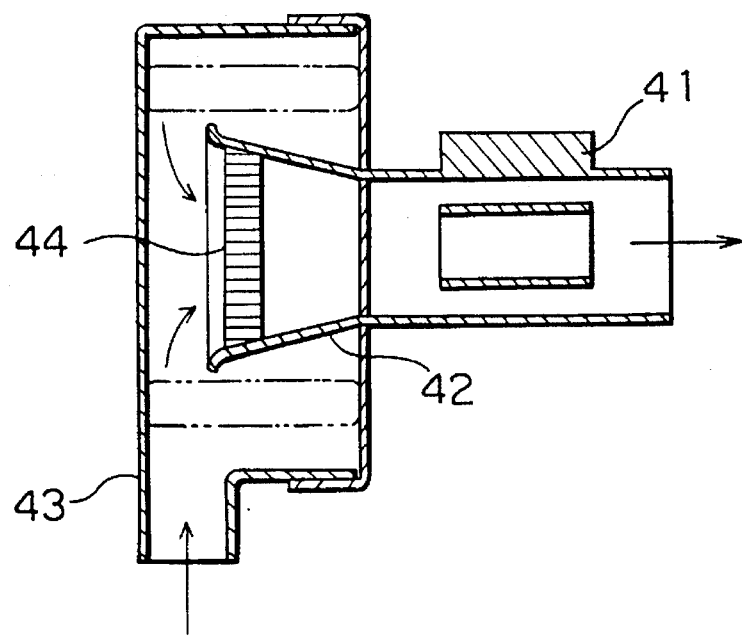
FIG. 15 is a sectional view of still a further example of the construction of an intake system using a conventional air flow sensor.
Figure 16:
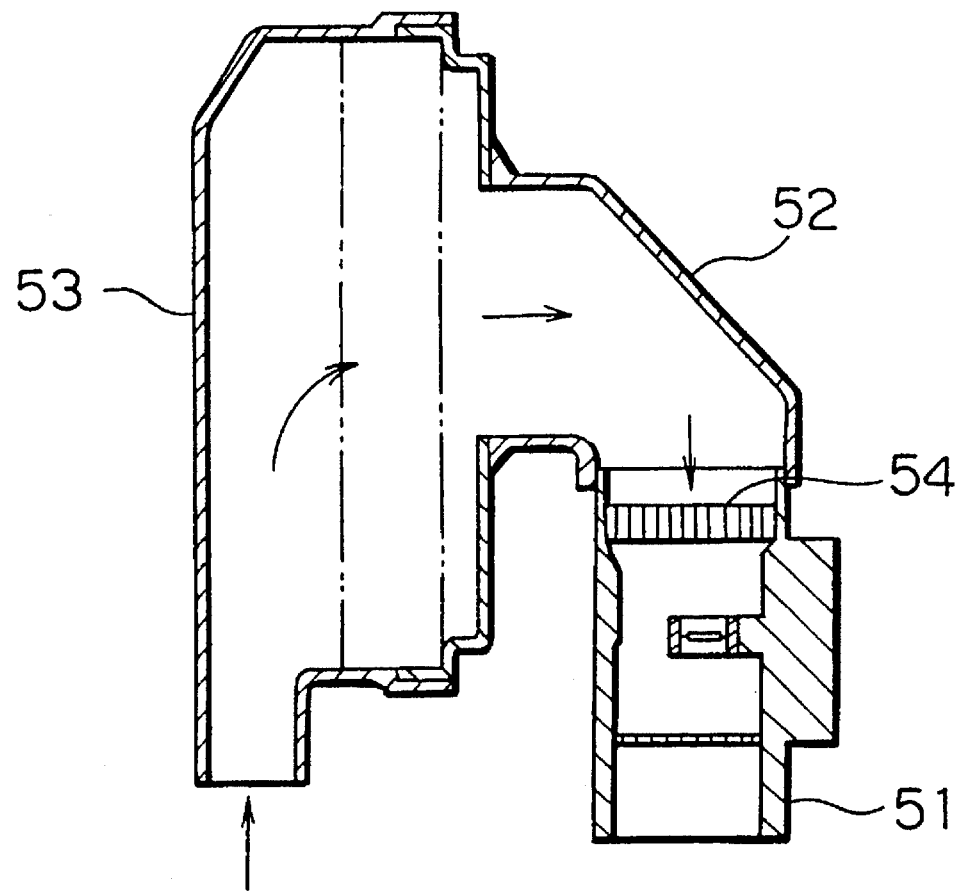
FIG. 16 is a sectional view of still a further example of the construction of an intake system using a conventional air flow sensor.

As illustrated in FIGS. 8 and 9, the swirl generating means 3 is formed in a dome 3 shape projecting upstream from the upstream end of the duct 1, integrally with the joint portion 6 and the duct 1o Four slit-like first openings 3C are radially formed on the dome 3 from the portion adjacent to the upstream end of the dome 3 to the joint portion 6. More specifically, when the dome 3 is viewed from upstream as shown in FIG. 10, it is formed of generally sector-like dome components 3D partitioned by the first openings 3C crossing at right angles with each other. The upstream ends of the respective dome components 3D are connected to each other on the extension of the axis line of the duct 1. As illustrated in FIGS. 11, the downstream ends of the respective dome components 3 are tilted downward from the right to the left so as to be connected to the inner surface of the duct 1 and, as shown in FIG. 10, circular arch-like second openings 3E radially enlarging by degrees are formed between the inner surface of the duct 1 and the dome components 3D. Thus, the air flowing from the second openings 3E is introduced into the first openings 3C along the downwardly tilting bottom ends of the dome components 3D so as to be flown into the thermal-type flow rate detection device 2 while it produces a swirl in the duct 1. The points X, Y and Z in FIG. 11, indicate the same positions.

The operation of the air flow sensor will now be explained. In order to supply air to the engine, the air first flows into the intake passage and is then fed into the duct 1 while being circulated by the swirl generating means 3 of the air flow sensor. More specifically, the air flows from the first openings 3C of the projection dome 3 used as the swirl generating means, and also the air flows from the second openings 3E formed along the inner surface of the duct 1 and the outer surface of the dome 3. The air from the second openings 3E is introduced into the tilting bottom ends of the respective dome components 3D and joins together with the air flowing from the first openings 3C while producing a swirl. The joined air passes through the thermal-type flow rate detection device 2 and flows into the downstream end of the duct 1. The thermal-type flow rate detection device 2 detects the flow rate passing therethrough. As a result, advantages in Embodiment 2 similar to those obtained in Embodiment 1 can be expected.

Although the invention has been described in its preferred form, it is understood that the invention is not limited to the above embodiments.

What is claimed is:

1. An air flow sensor disposed in an intake passage through which air is supplied to an engine, said sensor including:
   a) a duct forming a part of said intake passage; and
   b) a detection device for generating an electrical signal corresponding to the air flow rate within said intake passage; said sensor further comprising:
   c) swirl generating means disposed in said duct for generating a swirl therein, and
   d) a projection arranged on said swirl generating means and extending upstream from and exteriorly an opening at an upstream end of said duct.

2. An air flow sensor according to claim 1, wherein said swirl generating means includes a flow setting cone (3A), and at least one guide vane (3B) for supporting said cone, at the center of said opening at the upstream end of said duct, and wherein said projection is formed as a part of said flow setting cone and said guide vane.

3. An air flow sensor according to claim 2, wherein the upstream end of said duct in an axial section enlarges toward the upstream end along with a curved shape of said flow setting cone and said guide vane.

4. An air flow sensor according to claim 3, wherein said detection device is fixed to a downstream end of said flow setting cone.

5. An air flow sensor according to claim 4, wherein said duct is provided with a Venturi portion where the inner diameter of said duct is minimized further upstream of said detection device.

6. An air flow sensor according to claim 5, wherein a detection passage surrounding at least a part of said detection device is disposed at the downstream end of said flow setting cone.

7. An air flow sensor according to claim 6, wherein said guide vane is swept back in the air-flowing direction, and defines a first angle of attack relative to a surface including a center axis of said duct, and a second angle of attack relative to a surface including a radius of said duct.

8. An air flow sensor disposed in an intake passage through which air is supplied to an engine, said sensor including;
   a) a duct forming a part of said intake passage;
   b) a detection device for generating an electrical signal corresponding to the air flow rate within said intake passage;
   c) swirl generating means disposed in said duct for generating a swirl therein; and comprising
   d) a dome-shaped projection extending upstream from and exteriorly an opening at an upstream end of said duct and
   e) at least one opening formed in said dome-shaped projection.

* * * * *